United States Patent

[11] 3,610,146

[72] Inventor  Graham J. Willmott
               Birkenhead, England
[21] Appl. No. 730,845
[22] Filed    May 21, 1968
[45] Patented Oct. 5, 1971
[73] Assignee Victory-Kidder Printing Machine Company Limited
               Birkenhead, England
[32] Priority May 25, 1967
[33]          Great Britain
[31]          24313/67

[54] PRINTING MACHINE CYLINDER MOUNT
     7 Claims, 12 Drawing Figs.
[52] U.S. Cl. .................................................. 101/216,
                                                                101/248
[51] Int. Cl. ..................................................... B41f 13/14,
                                                                B41f 13/20
[50] Field of Search .......................................... 101/216,
                        217, 248; 29/113, 116; 308/9; 100/120

[56]                References Cited
                UNITED STATES PATENTS
3,014,421  12/1961  Townsend ..................... 101/217 X
3,070,872  1/1963   Ulrichs et al. ................. 29/113 AD
3,196,520  7/1965   Appenzeller ................... 29/116 AD
3,221,389  12/1965  Cowell .......................... 29/116
3,276,102  10/1966  Justus ........................... 29/116 AD
3,362,055  1/1968   Bryce ............................ 29/113 AD
3,386,149  6/1968   Robertson ..................... 29/116 AD
3,473,410  10/1969  Kraft ............................. 101/217 X
2,908,964  10/1959  Appenzeller ................... 29/116 AD
3,489,082  1/1970   Morris ........................... 101/216 X Primary Examiner—J. Reed Fisher
Attorney—Laurence R. Brown ABSTRACT: A printing machine disclosed here has a cylinder mounted in a frame by a compound bearing having inner and outer bearing members relatively rotatable, one being on the cylinder. Between the bearings on one member is a plurality of recesses into which liquid is forced. By creating and controlling differences of temperature between the cylinder and frame the bearing is held to proper size to eliminate slack.

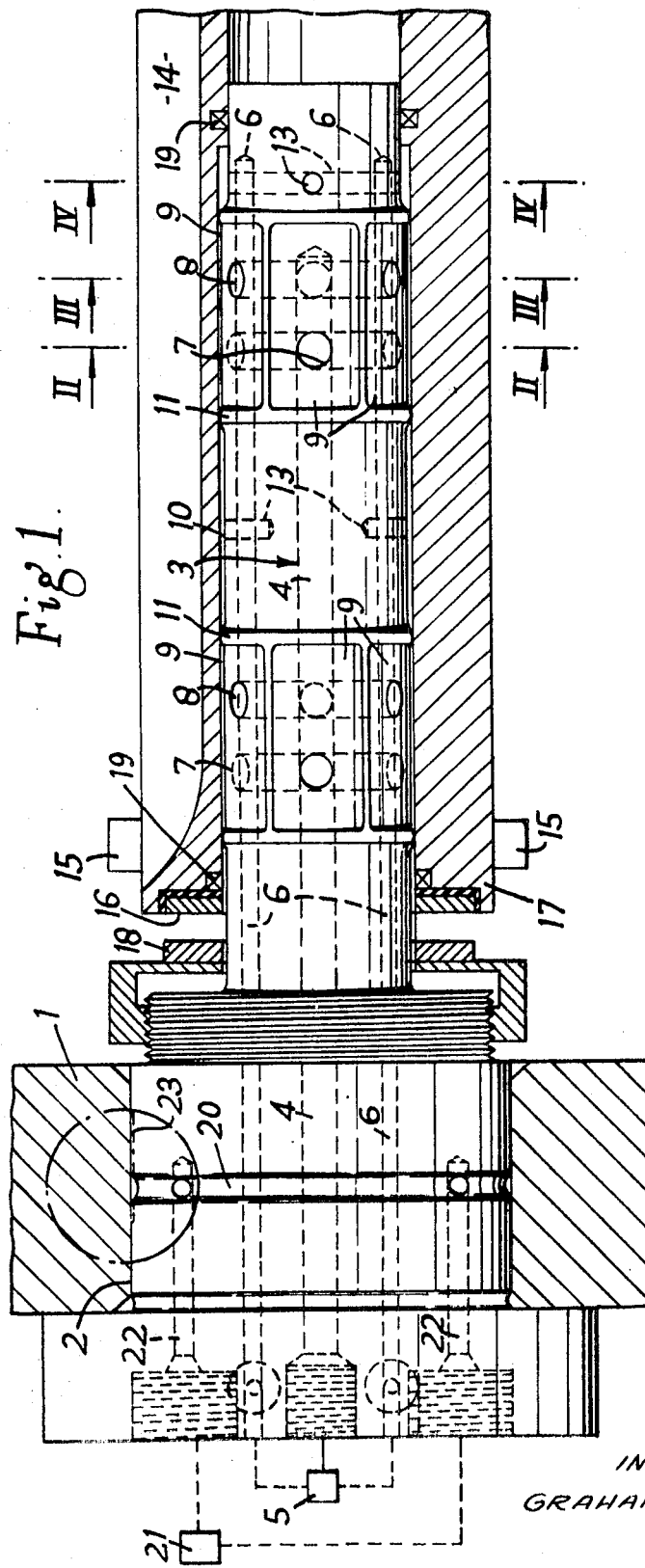

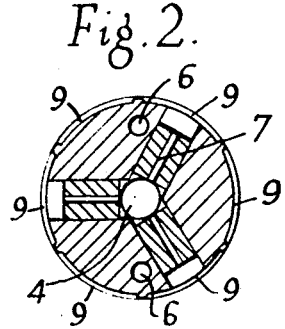
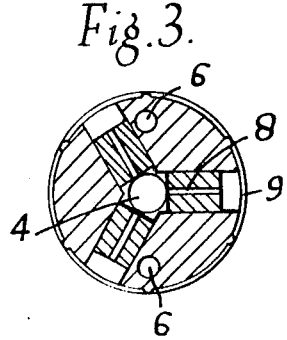
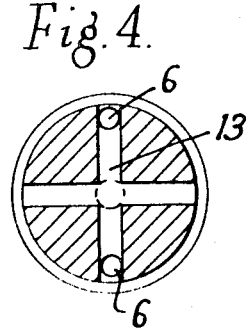
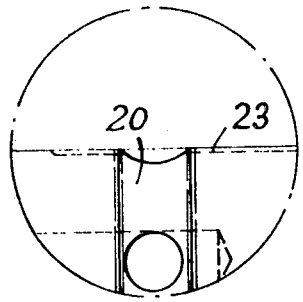
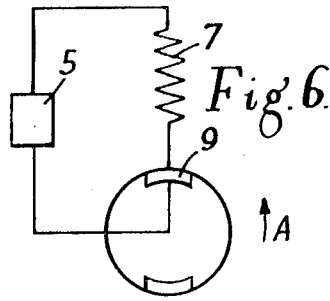
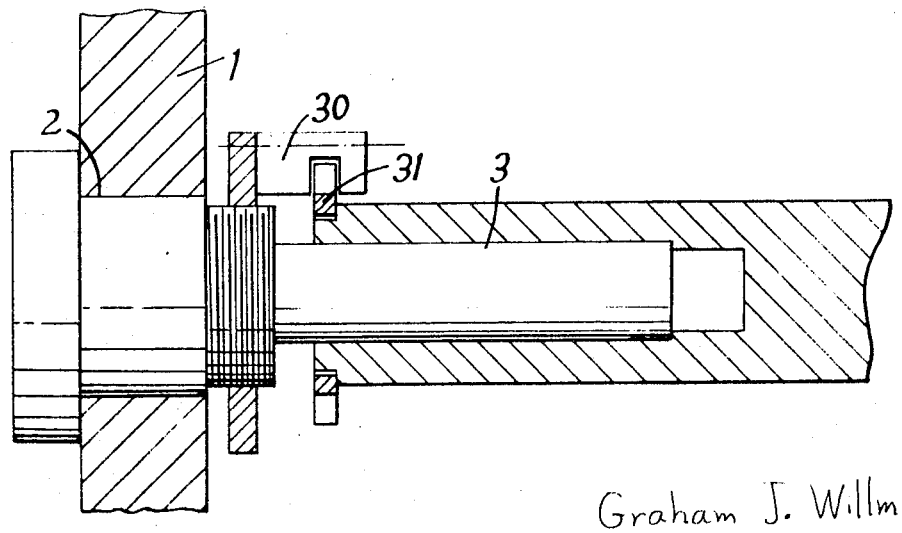

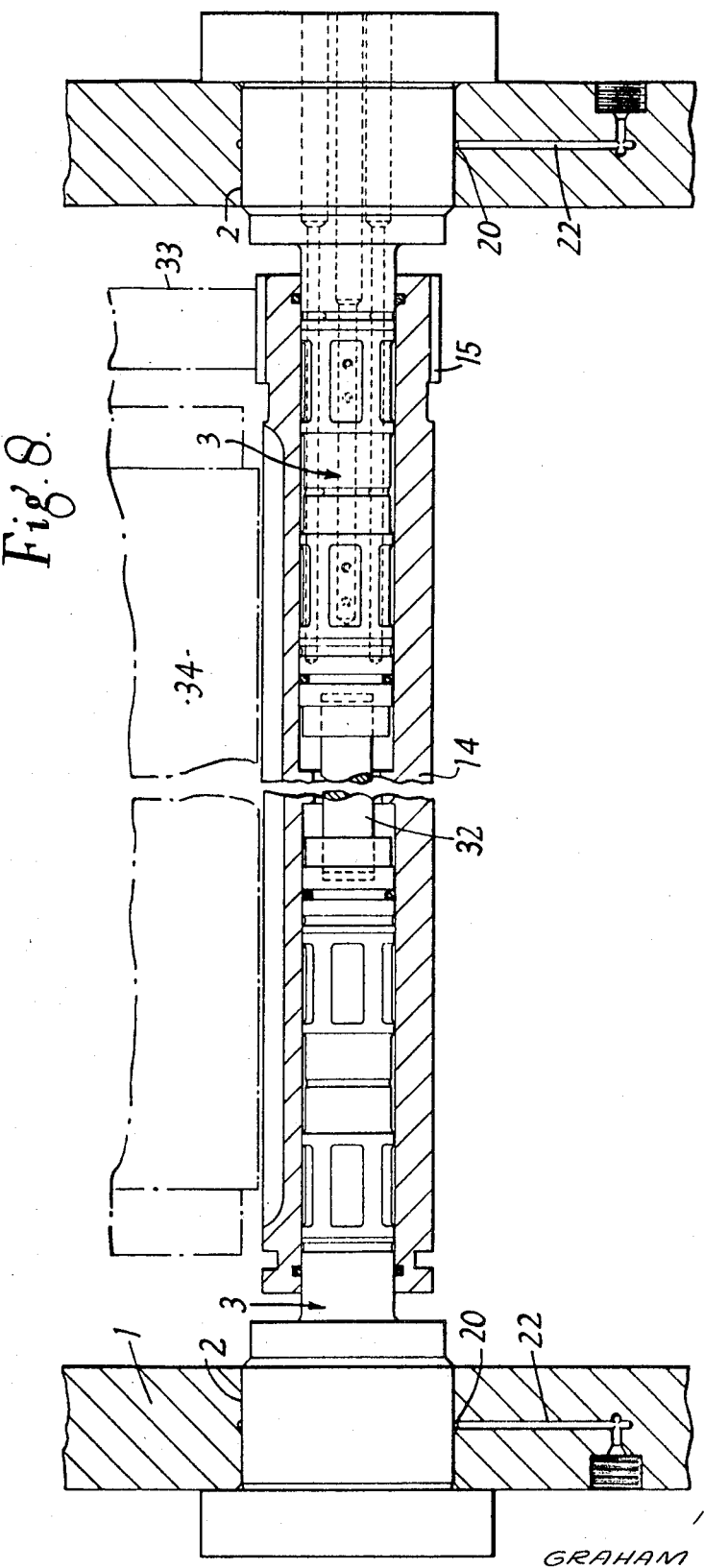

Graham J. Willmott

By

Lawrence R. Brown

Graham J. Willmott
By
Laurence R. Brown

PRINTING MACHINE CYLINDER MOUNT

This invention has reference to the mounting of printing machine cylinders in printing machines.

Cylinders of printing machines are usually mounted between side frames on the machines by means of bearing housings mounted within an aperture in the side frames, each housing containing a plurality of rolling bearing elements which support the cylinder on a diameter which enters the housing.

There is inevitably a certain amount of slack or "slop." between the housing and the side frame, and the cylinder diameter and the rolling bearing elements. This means that when a displacement force is applied to the cylinder, a limited displacement of the cylinder will occur because there will be little counterforce to counteract the displacement.

It is an object of the present invention to provide an improved mounting of printing machine cylinders within the printing machines.

According to the first embodiment of the invention a printing machine cylinder mounting comprises an inner bearing member, an outer bearing member, one of which bearing members is rotatable relatively to the other and one of the bearing members having a mounting for or constituting part of a printing machine cylinder, a plurality of recesses provided in one of the bearing members in the space between the bearing members, a liquid passage including a means of restricting the liquid flow, and a space between the bearing member through which liquid is forced whereby the liquid provides a support for the one bearing member relative to the other.

According to another aspect of the present invention a method of mounting a cylinder bearing support or an inner bearing member of a printing machine cylinder mounting in a side frame of a printing machine comprises the steps of creating a difference in temperature between the side frame and the cylinder bearing support so that the dimensions of the cylinder bearing support are slightly smaller than the size of the aperture in the side frame into which it is to be inserted, inserting the cylinder bearing support into the aperture in the side frame, allowing the difference in temperature to be neutralized whereby the cylinder bearing support fills the aperture, applying liquid under high pressure between the side frame and the cylinder bearing support to expand the side frame and contract the cylinder bearing support, adjusting the position of the cylinder bearing support and releasing the pressure of the liquid.

Mountings for a cylinder of a printing machine in accordance with the present invention will now be described, by way of example, with reference to the accompanying drawings wherein:

FIG. 1 is a side view partly in section of a printing machine cylinder of relatively light weight and small diameter mounted within a side frame with a permanent magnet mechanism for controlling the axial displacement of the printing machine cylinder;

FIGS. 2, 3 and 4 are 'revolved' vertical sections taken along the lines II—II, III—III, IV—IV, of FIG. 1:

FIG. 5 is an enlarged view of the part or the side frame shown within the chain line circle in FIG. 1;

FIG. 6 is a simplified diagram of the hydraulic circuit;

FIG. 7 is a sectioned side view of a modified printing machine cylinder mounting;

FIG. 8 is a side view partly in section of a second embodiment of a printing machine cylinder mounting;

Figure 9:
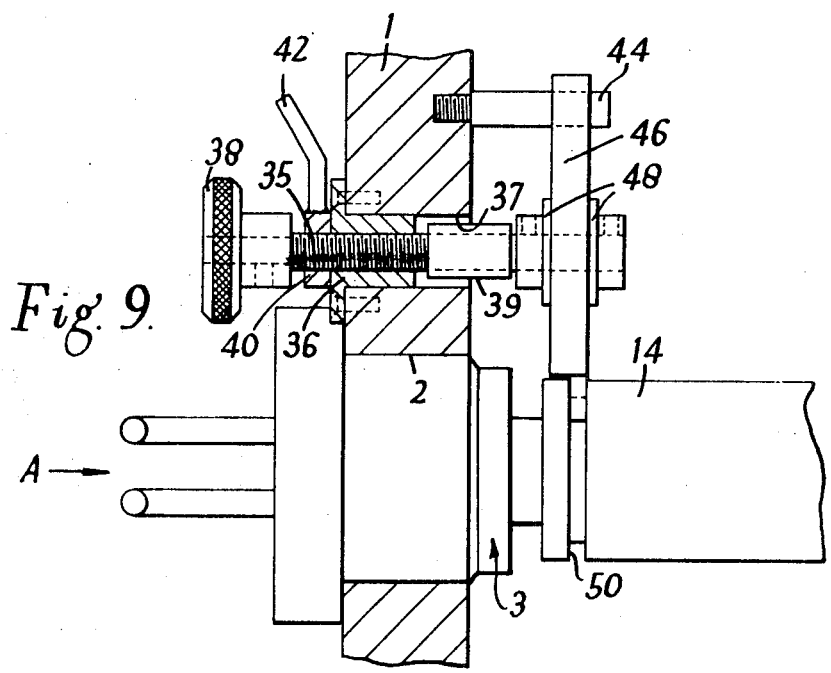
FIG. 9 is a sectioned side view of a further printing machine cylinder mounting.

As shown in the drawings, a printing machine frame comprises a pair of side frames 1 (only one of which is shown in FIGS. 1 and 8), each side frame having an aperture 2 in which an inner bearing member in the form of a stub axle 3 is located. The longitudinal axis of the stub axle 3 is eccentric with respect to the longitudinal axis of the aperture 2. The stub axle 3 has a plurality of passages formed in it. A flow passage 4 serves as a supply pipe from a supply 5 of pressurized liquid, such as oil, and a set of passages 6 serve as return passages for the oil. These passages 6 may be connected to a source of suction to assist in the return of the oil to the sump of the oil supply 5. The central passage 4 in the stub axle is connected to means of restricting the liquid flow in the form of a first set of restrictions 7 and a second set of restrictions 8. Each set of restrictions is arranged as three restricted passages provided at equispaced intervals around the passage 4. The respective restricted passages of the second set 8 are disposed equispaced circumferentially in a position midway between the positions of the respective restricted passages of the first set of restrictions 7. Each of these restricted passages communicates with a respective recess or pocket 9 at the periphery of the stub axle. As shown in the drawings, the stub axle has two areas each of which contains sets of restrictions 7, 8 and pockets 9 and each of which areas is separated from a central part 10 which forms a single circumferential pocket. A wall part 11 is situated between each of the two areas and the central part 10. The set of oil return passages 6 which are formed in the stub axle 3 communicate with radial passages 13 which serve as passages for the return of the oil to the sump of the oil supply 5.

An outer bearing member in the form of a printing machine cylinder 14 fits over the stub axle 3 and a cylinder gear drive 15 is mounted at one end of the cylinder to provide a part of a gear train to drive the cylinder 14 from a drive motor (not shown). The printing cylinder 14 fits snugly over the stub axle 3 with a minimum clearance but with the pockets 9 between the stub axle 3 and the inside of the printing cylinder 14. A permanent magnet mechanism for controlling the axial displacement of the printing machine cylinder 14 comprises a permanent magnet 16 (shown in FIG. 1) fitted at one end of the cylinder in a brass cup 17 set into the end of the cylinder 14 and a second permanent magnet 18 mounted on the stub axle in close juxtaposition to the magnet 16. The magnets 16, 18 are arranged with their like poles close to one another so that these magnets repel each other. A similar magnet 16 is mounted on the far end of the printing cylinder (not shown) and a similar magnet 18 is mounted on the other stub axle (not shown) and a similar magnet 18 is mounted on the other stub axle (not shown) which is mounted in the other side frame (not shown) of the printing machine. Likewise, the adjacent faces of the two other magnets have like polarity. By using these two pairs of magnets on the printing cylinder there is provided a frictionless mounting which can be of high stiffness depending on the degree of magnetism of the magnets. An oil seal 19 prevents the spread of oil along the printing cylinder 14.

As shown in FIGS. 1 and 5, the stub axle 3 or cylinder bearing support has a circumferential groove 20 at that part of the stub axle which lies within the side frame 1. A supply 21 of high-pressure liquid, for example, oil, is connected to a pair of longitudinal passages 22 which connect with the circumferential groove 20 which in turn connects with an area 23 around the circumference of the stub axle. When the stub axle 3 is to be inserted into the aperture 2 of the side frame, the stub axle is contracted by cooling until the dimensions of the stub axle are slightly less than the dimensions of the aperture 2 in the side frame. The stub axle is then inserted into the aperture and allowed to expand. When it is required accurately to adjust the axial or radial position of the stub axle in the side frame, the supply of high-pressure oil 21 is connected to the passages 22 and hence to the groove 20 and the area 23. The oil then forms a high-pressure medium between the outside surface of the stub axle 3 and the inside surface of the side frame 1 and this causes the stub axle to contract and the side frame to expand. At this time the position of the stub axle in the side frame may be adjusted axially by axial movement of the stub axle 3 and/or radially by rotation of the eccentrically mounted stub axle 3 until it reaches its required accurately located position. When this position is secured the oil pressure is released, the stub axle expands, the side frame contracts and the stub axle is fitted securely within the side frame in its required accurately located position. It is found that from the time of release of the high oil pressure the position of the stub axle is changed by a very small distance which may be measured in units of microinches.

In FIG. 6 there is shown diagrammatically the oil supply 5 connected to a restriction 7 and a pocket 9 and through the return passages 13 and 12 to the oil supply 5.

When the printing machine cylinder 14 is fitted on to the two stub axles fitted into the two side frames 1 (only one of which is shown in FIG. 1) the supply 5 of oil pressurized is connected to the passage 4 and oil then passes through the passage 4 through the restrictions 7 and 8 into the pockets 9 and then passes longitudinally along the stub shaft to the return passages 6 and 13. The oil seals 19 prevent the spread of oil along the printing cylinder. It will be apparent that as the printing machine cylinder 14 rotates the oil serves as a support for the cylinder rotating around the stub axle. If there is any displacement of the printing machine cylinder in the direction of the arrow A (FIG. 6) this is immediately countered by virtue of an increase in the pressure of the oil in the pocket 9 (shown in FIG. 6) to counter this displacement. For example, if in FIG. 6 there is a supply of pressure of 2 x across the oil supply 5 and if when the cylinder is rotating normally there is a pressure of 4 developed across the restriction 7, there would be a pressure of x developed in the pocket 9 and in the passages and from the supply. Any movement of the printing cylinder towards the pocket 9 will be accompanied by a reduction in the amount of flow of oil through the restriction 7 and this will mean a reduction in the pressure developed across the restriction and hence an increase in the pressure developed in the pocket 9. It will be apparent that this increase of pressure in the pocket 9 will immediately serve to correct the displacement of the printing cylinder. Likewise displacement of the printing cylinder in the direction A will cause an increase in pressure in the restriction on the side of the printing cylinder diametrically opposite pocket 9 and this will cause a decrease of pressure in the pocket away from the direction of displacement. This will also serve to correct the displacement.

In FIG. 7 there is shown a modified permanent magnet mechanism for controlling the axial displacement of the printing cylinder. As shown the stub axle 3 is mounted in a side frame 1 and a first permanent magnet 30 is mounted on the stub axle 3. A second permanent magnet 31 is mounted on the printing cylinder and it is arranged that like poles of the two magnets lie close to one another. The magnet 30 embraces the magnet 31 so that the magnet 31 and hence the printing cylinder 14 is positioned lengthwise of the cylinder in the printing machine.

In FIG. 8 a second embodiment of a printing machine cylinder mounting is shown. The stub axles 3 shown in this embodiment are similar to those shown in the first embodiment shown in FIGS. 1 to 5; the differences being that the stub axles are joined by a shaft 32 and that the circumferential grooves 20 and the passages 22 are in the sidewalls 1 and not in the stub axles 3 as previously described. The mechanism for controlling the axial displacement of the printing machine cylinder 14 is different also and is described later with respect to FIGS. 9 and 10. The cylinder gear drive 15 of the print machine cylinder 14 engages a gearwheel 33 which is connected to a transfer cylinder 34 which is adjacent the printing machine cylinder 14, (gear wheel 33 and cylinder 34 are shown in chain line in FIG. 8).

Figure 10:
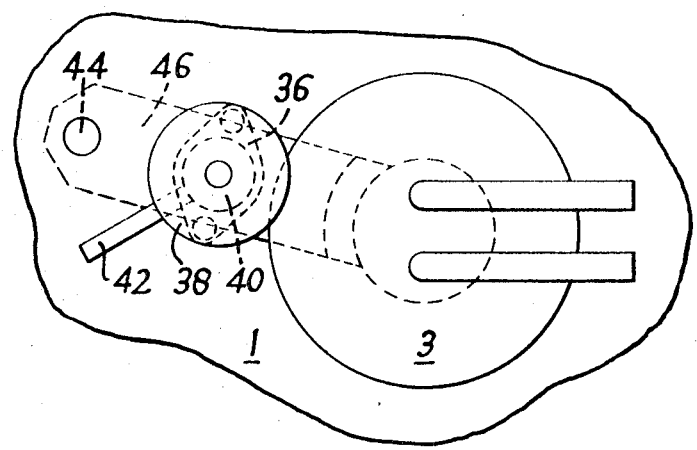
FIG. 10 is a front view of the printing machine cylinder mounting shown in FIG. 9 viewed in the direction of arrow 'A'.

FIG. 9 and 10 there is shown a mechanical mechanism for controlling the axial displacement of the printing cylinder 14. As shown in the Figures the stub axle 3 is nonrotatably mounted in the aperture 2 in the side frame 1 and the printing machine cylinder 14 is rotatably mounted on the stub axle. A first member in the form of a threaded bolt 35 is threadably engaged with an internally threaded, flanged bush 36 which is nonrotatably mounted in an aperture 37 in the side frame 1. The bolt 32 has a knurled knob 38 which is situated at the 'outside' side of the side frame 1. The knob 38 is used to rotate the bolt 35 so as to move the bolt 35 along its longitudinal axis, which is parallel to the longitudinal axis of the printing machine cylinder 14, by an extent controlled by a stop in the form of a collar 39. A locking collar 40 having a handle 42 is threadably engaged on the bolt 35 and is situated between the flanged bush 36 and the knob 38. A pillar 44 is threadably engaged at on end to the side frame 1 so that the axes of the printing machine cylinder 14, the bolt 35 and the pillar 44 all lie on a straight line. A second member in the form of a plate 46 which is of rectangular shape with one side edge curved into a concave shape is rotatably connected to the bolt 5 by means of a pair of flanged bushings 48. The plate 46 has an aperture through which the pillar 44 passes so as to hold the plate normal to the longitudinal axis of the printing machine cylinder 14. The curved side edge of the plate 46 engages within an annular groove 50 which is situated adjacent to the end face of the printing machine cylinder 14.

Figure 11:
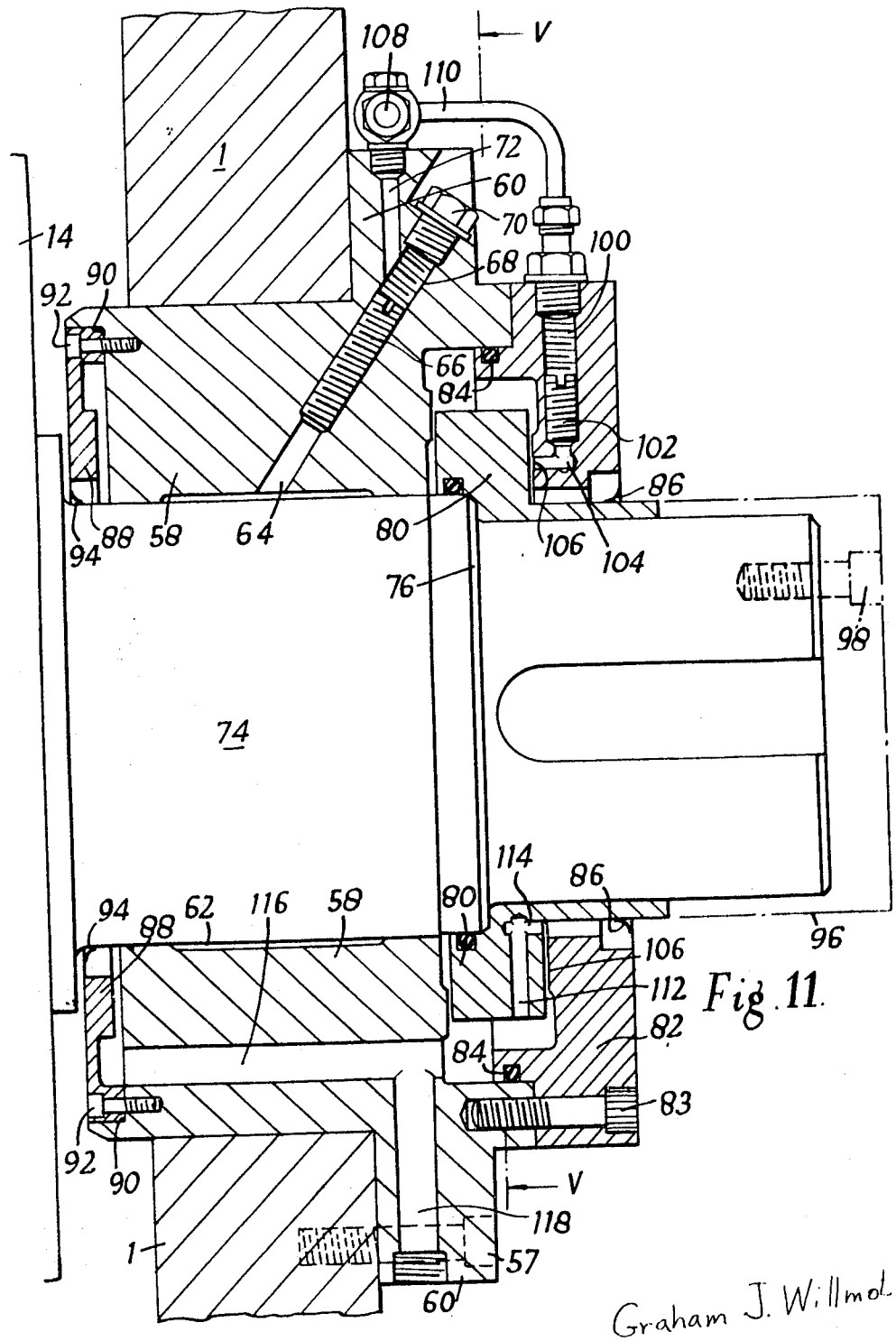
FIG. 11 is a sectioned side view of one side of a further printing machine mounting for a printing machine cylinder of relatively heavy weight and large diameter in comparison with the printing machine cylinder shown in FIG. 1.
Figure 12:
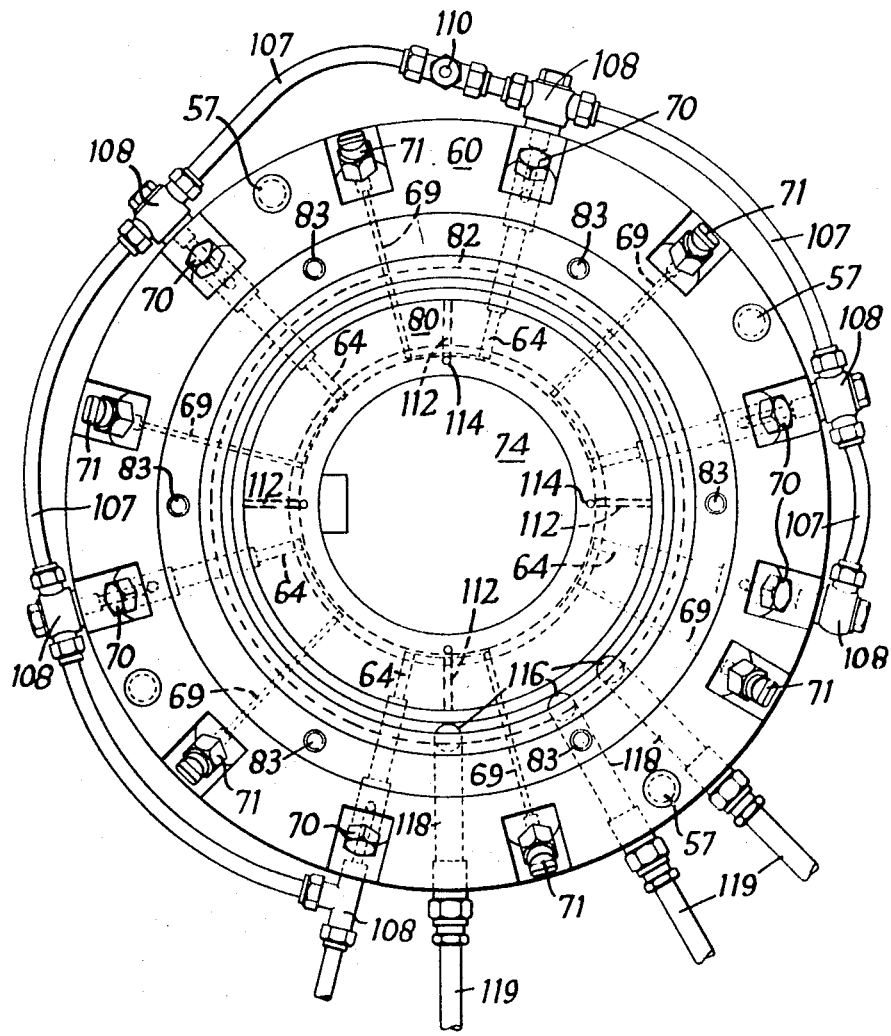
FIG. 12 is a sectioned partial front view of the printing machine cylinder mounting taken along the line V—V of FIG. 11.

In FIGS. 11 and 12 there is shown a further printing machine mounting in which a journal bearing 55 at one side frame 1 is combined with a hydraulic mechanism for controlling the axial displacement of the printing cylinder 14. The other side frame (not shown) has the journal bearing 55 only.

The journal bearing 55 comprises an outer bearing member in the form of a flanged bearing 58 which is nonrotatably mounted by the outer bore in the aperture 2 in the side frame 1 with the flange 60 on the opposite side to the printing machine cylinder 14. The side frame is split horizontally through the longitudinal axis of the aperture 2 so that the flanged bearing 58 is clamped by the two parts of the side frame 1 and held by the bolts 57 through the flange 60. The longitudinal axes of the flanged bearings 58 and the apertures 2 are coaxial.

The inner bore of the flanged bearing 58 has six equispaced recesses or pockets 62 which are each connected to an inclined radial bore 64 having a restriction in the form of an externally threaded bush 66. The inclined radial bore 64 opens out to a threaded bore 68 which comes out of the flanged bearing 58 on the flange 60. The threaded bore 68 is capped off by a threaded cap 70. A vertical radial bore 72 in the flange 60 joins the inclined radial bore 64 at the threaded bore 68 between the bush 66 and the cap 70. Each pocket or recess 62 of the flanged bearing 58 has another inclined bore 69 (FIG. 12) which lies approximately parallel to and spaced circumferentially from the radial inclined bore 64 and which ends in a diaphragm pressure valve 71 (FIG. 12). The diaphragm pressure valves 71 can be connected to a pressure-monitoring device (not shown) so as to give an electric signal should the pressure in the pockets 62 fall below a level set in the valves 71.

The journal bearing 55 comprises also an inner bearing member in the form of a spindle 74 of the printing machine cylinder 14. The spindle 74, which is nonrotatably connected to the printing machine cylinder 14, passes through the flanged bearing 58 and then reduces in diameter to form a step 76 against which is abutted a flanged thrust collar 80 which is coaxially and nonrotatably mounted to the spindle 74. The thrust collar 80 is covered by an extension of the outer bearing member in the form of an annular collar 82 which is attached to the flanged bearing 58 by the bolts 83 (only one shown) and which has an 'O' seal 84 adjacent the point of attachment. An oil-retaining ring seal 86 is situated between the annular collar 82 and the thrust collar 80. An annular sideplate 88 is secured with an annular gasket 90 and bolts 92 to the portion of the flanged bearing 58 situated on the same side of the side frame 1 as the printing machine cylinder 14. An oil-retaining ring seal 94 is situated between the annular sideplate 88 and the spindle 74 of the printing machine cylinder 14. The projecting end of the spindle 74 may be capped by a cap 96 which is bolted over the spindle by bolts 98 (only one shown).

The hydraulic mechanism for controlling the axial displacement of the printing machine cylinder 14 comprises the flanged thrust collar 80 and the annular collar 82. The annular collar 82 has a vertical, radial bore 100 having a restriction 102, and the bore 100 joins an axial bore 104 situated within the annular collar 82 and opening into an annular groove 106 which is adjacent the flange of the flanged thrust collar 80. The vertical radial bores 72 in the flange 60 of the flanged bearing 58 are each joined by a connector 108 to an oil feed pipe 107 (FIG. 12), which is situated round the circumference of the flange 60 of the flanged bearing 58, and which is connected to a source of pressurized oil (not shown). The vertical radial bore 100 in the annular collar 82 is joined by an L-shaped oil feedpipe 110 to the oil feedpipe 107 (FIG 12).

The flange or the flanged thrust collar 80 has four vertical bores 112 which are equispaced round the flange and which join axial bores 114 which join the annular space between the flanged thrust collar 80 and the annular collar 82 to the annular space between the flanged bearing 58 and the annular collar 82.

The flanged bearing 58 has three axial bores 116 which are situated in, and at or near the lowest point of, the nonflanged part of the flanged bearing 58 and which join the annular space between the annular sideplate 88 and the flanged bearing 58 to the annular space between the annular collar 82 and the flanged bearing 58. Each of the axial bores 116 forms a junction with a vertical, radial bore 18 which is joined to an oil return pipe 119. The oil return pipes 119 are connected to the source of pressurized oil (not shown) to recirculate the pressurized oil.

A diaphragm valve (not shown) is in communication with the annular space between the flanged bearing 58 and the flange of the flanged thrust collar 80.

A further diaphragm valve (not shown) is in communication with the annular space between the annular collar 82 and the flange of the flanged thrust collar 80.

These diaphragm valves (not shown) serve to give an electric impulse should the pressure drop below a predetermined amount and the operation is similar to the operation of the diaphragm pressure valves 71.

The operation of the journal bearing 55 and the combined hydraulic mechanism for controlling the axial displacement of the printing machine cylinder 14 is identical to the previous description given with regard to FIG. 6.

The printing machine cylinder mounting described with reference to FIGS. 11 and 12 can be axially or radially adjusted with respect to the side frame 1 by the method previously described with regard to the printing machine cylinder mounting described with reference to FIGS. 1 to 5.

It is intended that the mountings for the cylinder as hereinbefore-described shall be used for mounting printing or plate cylinders, as well as blanket impression and inking cylinders of all kinds of printing machines, including printing machines for printing on plastic material film, for example, polyethylene.

What we claim is:

1. In a printing machine, a cylinder, a mounting having means for confining the axial displacement of the cylinder, the combination comprising an inner bearing member, an outer bearing member which is rotatable relatively to the inner bearing member and has a mounting constituting part of a printing machine cylinder, a plurality of recesses provided in one of the bearing members on a surface in the space between the inner and outer bearing members, a liquid passage leading to said recesses including restriction means, a liquid passage leading from said recesses, and means continuously circulating liquid through said liquid passages and between the bearing members into said recesses whereby the liquid provides a support for the one bearing member relative to the other.

2. A printing machine cylinder mounting as claimed in claim 1, wherein the printing machine cylinder mounting further comprises a frame and a mechanism for controlling the axial displacement of the printing machine cylinder relative to said frame.

3. A printing machine cylinder mounting, comprising a cylinder, means for confining axial displacement of the cylinder, an inner bearing member, an outer bearing member which is mounted on and coaxial with and rotatable relative to the inner bearing member and which comprises part of said printing machine cylinder, a plurality of recesses in the exterior peripheral surface of the inner bearing member between the bearing members, a flow passage for liquid including restricting means situated in the inner bearing member and in communication with the plurality of recesses, and at least one return passage from said recesses situated in inner bearing member, means continuously circulating liquid through the flow passage, the restricting means, the plurality of recesses, and at least one return passage so that the liquid provides a support for the outer bearing member relative to the inner bearing member.

4. A printing machine cylinder mounting claimed in claim 3, wherein the plurality of recesses in the exterior peripheral surface of the inner bearing member are arranged in at least one annular band around the circumference of the exterior peripheral surface of the inner bearing member and wherein each of the recesses is connected to the flow passage by one of the restricting means.

5. A printing machine cylinder mounting as claimed in claim 4, wherein said annular band of recesses is adjacent a single annular recess around the exterior peripheral surface of the inner bearing member, and wherein said single annular recess is connected to at least one return passage.

6. A printing machine cylinder mount comprising in combination, a frame, an axle member, means in said frame for mounting said axle member nonrotatably, a printing machine cylinder mounted concentrically about said axle to rotate thereabout means confining the axial displacement of said cylinder, structure providing a recessed pocket between said axle and said cylinder capable of maintaining a fluid under pressure for supporting the position of said axle within said cylinder, a fluid flow path into and out of said recessed pocket, a restriction is said flow path outside said recessed pocket, and means supplying continuous fluid flow into said pocket at such pressure that the cylinder tends to be held in an optimal position relative to said axle member by means of relative pressures at said pocket and said restriction.

7. A printing machine cylinder mount as defined in claim 6 wherein said means confining the axial displacement includes means holding said cylinder axially in a predetermined position on said axle relative to said frame.